United States Patent
Ootsuka et al.

(10) Patent No.: US 7,224,534 B2
(45) Date of Patent: May 29, 2007

(54) OPTICAL ELEMENT, OPTICAL UNIT, AND IMAGE-TAKING APPARATUS

(75) Inventors: Tetsuya Ootsuka, Asaka (JP); Takashi Kato, Minami-Ashigara (JP); Hitoshi Miyano, Saitama (JP)

(73) Assignees: Fujifilm Corporation, Tokyo (JP); Fujinon Corporation, Saitama (JP)

( * ) Notice: Subject to any disclaimer, the term of this patent is extended or adjusted under 35 U.S.C. 154(b) by 0 days.

(21) Appl. No.: 11/362,794

(22) Filed: Feb. 28, 2006

(65) Prior Publication Data
US 2006/0193058 A1    Aug. 31, 2006

(30) Foreign Application Priority Data
Feb. 28, 2005    (JP)    ............... 2005-053149

(51) Int. Cl.
*G02B 3/14*    (2006.01)
(52) U.S. Cl. .................................... 359/665
(58) Field of Classification Search ......... 359/665–667
See application file for complete search history.

(56) References Cited

U.S. PATENT DOCUMENTS 6,603,444 B1 *   8/2003   Kawanami et al. ........... 345/32
6,665,127 B2 *  12/2003   Bao et al. .................... 359/665
2006/0050402 A1 *  3/2006   Ito et al. ..................... 359/666

FOREIGN PATENT DOCUMENTS

| JP | 2001-13306 A | 1/2001 |
| JP | 2001-272646 A | 10/2001 |
| JP | 2004-4616 A | 1/2004 |
| JP | 2004-103957 A | 4/2004 |

OTHER PUBLICATIONS

"Philips' Fluid Lenses", Digital Photography Review, Mar. 3, 2004.

* cited by examiner

*Primary Examiner*—Scott J. Sugarman
*Assistant Examiner*—Darryl J. Collins
(74) *Attorney, Agent, or Firm*—Sughrue Mion, PLLC

(57) ABSTRACT

An optical element has a fluid container which contains an insulative fluid and a conductive fluid that are different in refractive index from each other, mutually immiscible, and optically transparent, the fluid container being transparent to light at least in a predetermined direction; a first electrode placed in contact with the conductive fluid in the fluid container; multiple transparent second electrodes placed on a transparent surface of the fluid container and insulated from the conductive fluid in the fluid container, with a voltage being applied between the first electrode and each of the multiple transparent second electrodes; and multiple transparent transistors placed on the transparent surface of the fluid container together with the multiple second electrodes to adjust the voltages applied to the multiple second electrodes.

5 Claims, 8 Drawing Sheets

(A)

(B)

OPTICAL ELEMENT, OPTICAL UNIT, AND IMAGE-TAKING APPARATUS

BACKGROUND OF THE INVENTION

1. Field of the Invention

The present invention relates to an optical element transparent to light, optical unit, and image-taking apparatus which acquires image data by making subject light form an image.

2. Description of the Related Art

Known variable-focal-length lenses include liquid crystal lenses which vary their focal length using electro-optical effect of liquid crystals. For example, Japanese Patent Laid-Open Nos. 2001-272646 and 2004-4616 describe a liquid crystal lens composed of two optically transparent substrates, a liquid crystal layer encapsulated between the two optically transparent substrates, and an electrode which applies a electric field to the liquid crystal layer. With this liquid crystal lens, the orientation of liquid crystal molecules changes with the intensity of the applied electric field, changing the refractive index of the liquid crystal lens and thereby adjusting the focal length of the liquid crystal lens.

In addition to the above liquid crystal lens, also known is a liquid lens which varies its focal length by changing surface shape of a conductive fluid by application of voltages to the conductive fluid. For example, an article "Philips' Fluid Lenses" (Mar. 03, 2004, Royal Philips Electronics) found at URL <http://www.dpreview.com/news/0403/04030302philipsfluidlens.asp> on Mar. 31, 2004 describes a liquid lens composed of a tube whose inner wall is covered by a water-repellent coating, a water-based conductive liquid and non-conductive oil encapsulated in the tube, and an electrode which applies an electric field to the water-based liquid in the tube. With this liquid lens, when no voltage is applied to the conductive water-based liquid, the water-based liquid is a hemispherical mass and an interface between the water-based liquid and oil is convex. The interface changes its shape from convex to concave according to the intensity of the electric field applied to the conductive water-based liquid. This changes the curvature radius of the lens, allowing the focal length to be changed freely.

The technique proposed in Japanese Patent Laid-Open No. 2001-272646 changes the focal length of the liquid crystal lens using the difference $\Delta n(n\psi-n\perp)$ between the refractive index $(n\psi)$ of liquid crystal molecules along the major axis and refractive index $(n\perp)$ of the liquid crystal molecules along the minor axis. However, the difference $\Delta n$ is too small to freely change the refractivity of the lens.

If the lens center can be shifted by changing the refractive index and surface shape, the direction of light exiting the lens can be adjusted. Thus, by mounting such a lens on a camera or the like, it is possible to prevent camera shake when shooting a subject. With the lenses described in Japanese Patent Laid-Open Nos. 2001-272646 and 2004-4616 and the article "Philips' Fluid Lenses," in order to shift the lens center, it is conceivable to place multiple electrodes in the lenses, connect a drive line to each of the electrodes to supply voltage, and separately control the voltages applied from the multiple electrodes. However, in order to control the shifting of the lens center finely, it is necessary to install a large number of electrodes and drive lines. Consequently, with a drive method which does not employ transistors, it is difficult to change the refractive index instantly because of the need to apply voltages to different locations in sequence. Furthermore, the supplied voltages concentrated near the lens develop heat in the lens, causing changes in the refractive index of the lens. On the other hand, with a drive method which employs transistors, although it is possible to change the refractive index instantly, typical transistors needs a black matrix to shield light, which reduces the aperture ratio, thereby impairing the functionality of the lens.

Incidentally, the above problems are not limited to lenses, and are true to optical elements such as parallel plates and prisms.

SUMMARY OF THE INVENTION

The present invention has been made in view of the above circumstances and provides an optical element, optical unit, and image-taking apparatus which can reduce heat generation in the optical element and accurately control the direction of light emitted from the optical element.

The present invention provides an optical element having:

a fluid container which contains an insulative fluid and a conductive fluid that are different in refractive index from each other, mutually immiscible, and optically transparent, the fluid container being transparent to light at least in a direction;

a first electrode placed in contact with the conductive fluid in the fluid container;

multiple transparent second electrodes placed on a transparent surface of the fluid container and insulated from the conductive fluid in the fluid container, with a voltage being applied between the first electrode and each of the multiple transparent second electrodes; and multiple transparent transistors placed on the transparent surface of the fluid container together with the multiple second electrodes to adjust the voltages applied to the respective multiple second electrodes.

Recently, it has been reported that a transparent transistor has been developed (Japanese Patent Laid-Open No. 2004-10395. The present invention uses such transparent transistors.

With the optical element according to the present invention, when a voltage is applied between the first electrode and each of the multiple second electrodes, the first electrode emits electric charge into the conductive fluid and each of the second electrodes collects electric charge of opposite polarity to the emitted electric charge. Consequently, the electric charge of the conductive fluid and the electric charge collected on each of the second electrodes attract each other by Coulomb force, changing the shape of the boundary surface between the conductive fluid and insulative fluid. Since the conductive fluid and insulative fluid differ in refractive index, changes in the shapes of their liquid surfaces change the profile of the refractive index as an optical device, adjusting the direction of light emitted from the optical element.

Since multiple transparent transistors are provided to adjust the voltages applied to the multiple second electrodes, the focal length of the optical element can be adjusted quickly with high accuracy. Also, the multiple transparent transistors can produce voltages to be applied to the respective multiple second electrodes, eliminating the need for voltage lines used to supply voltages to individual second electrodes and thereby avoiding such problems as heat generation caused by a large voltage build-up in the optical element and deviations in the refractive index of the optical element.

In the optical element according to the present invention, preferably an inner surface of the fluid container is covered at least partially with a coating whose wettability by the conductive fluid is lower than by the insulative fluid.

The coating makes it possible to change the shape of the boundary surface between the conductive fluid and insulative fluid efficiently.

In the optical element according to the present invention, preferably the multiple second electrodes are arranged in a matrix.

By separately controlling the voltages applied to the second electrodes arranged in a matrix, it is possible to create a desired distribution of the refractive index.

Also, the present invention provides an optical unit having:

a fluid container which contains an insulative fluid and a conductive fluid that are different in refractive index from each other, mutually immiscible, and optically transparent, the fluid container being transparent to light at least in a predetermined direction;

a first electrode placed in contact with the conductive fluid in the fluid container;

multiple transparent second electrodes placed on a transparent surface of the fluid container and insulated from the conductive fluid in the fluid container, with a voltage being applied between the first electrode and each of the multiple transparent second electrodes;

multiple transparent transistors placed on the transparent surface of the fluid container together with the multiple second electrodes to adjust the voltages applied to the multiple second electrodes; and a control section which controls refraction of light passing through the fluid container by applying individually drive signals to the multiple transistors separately, thereby applying a voltage between the first electrode and each of the multiple second electrodes, and thereby changing shape of a boundary surface between the insulative fluid and the conductive fluid.

As with the optical element according to the present invention, the optical unit according to the present invention can reduce heat generation in the optical unit and accurately control the direction of light emitted from the optical unit.

Incidentally, only a basic mode of the optical unit according to the present invention is described here, but this is for the purpose of avoiding redundancy, and the optical unit according to the present invention includes various modes corresponding to the various modes of the optical element described earlier in addition to the basic mode described above.

Also, the present invention provides an image-taking apparatus, having:

a fluid container which is transparent to light at least in a predetermined direction and contains a fluid;

an optically transparent dispersion medium contained in the fluid container;

an optically transparent dispersoid which, being dispersed in the dispersion medium and different in refractive index from the dispersion medium, achieves an electrophoretic movement in the dispersion medium by application of an electric field a first electrode;

multiple transparent second electrodes placed on a transparent surface of the fluid container, with a voltage being applied between the first electrode and each of the multiple transparent second electrodes;

multiple transparent transistors placed on the transparent surface of the fluid container together with the multiple second electrodes to adjust the voltages applied to the multiple second electrodes;

a control section which controls refraction of light passing through the fluid container by applying individually drive signals to the multiple transistors separately, thereby applying a voltage between the first electrode and each of the multiple second electrodes, and thereby changing shape of a boundary surface between the insulative fluid and the conductive fluid; and an image pickup device which generates an image signal of subject light that forms an image on a surface of the image pickup device after passing through the fluid container.

The image pickup device according to the present invention typically means a CCD or CMOS sensor containing light-sensitive elements which receive light and generate a photoelectric signal.

The image-taking apparatus according to the present invention can accurately control the direction of light emitted from the optical element and obtain taken images of high quality.

Incidentally, only a basic mode of the image-taking apparatus according to the present invention is described here, but this is for the purpose of avoiding redundancy, and the image-taking apparatus according to the present invention includes various modes corresponding to the various modes of the optical element described earlier in addition to the basic mode described above.

The present invention provides an optical element, optical unit, and image-taking apparatus which can reduce heat generation in the optical element and accurately control the direction of light emitted from the optical element.

DETAILED DESCRIPTION OF THE INVENTION

Before describing an embodiment of the present invention, problems with the liquid lens described in the article "Philips' Fluid Lenses" will be analyzed in detail below.

Figure 1:
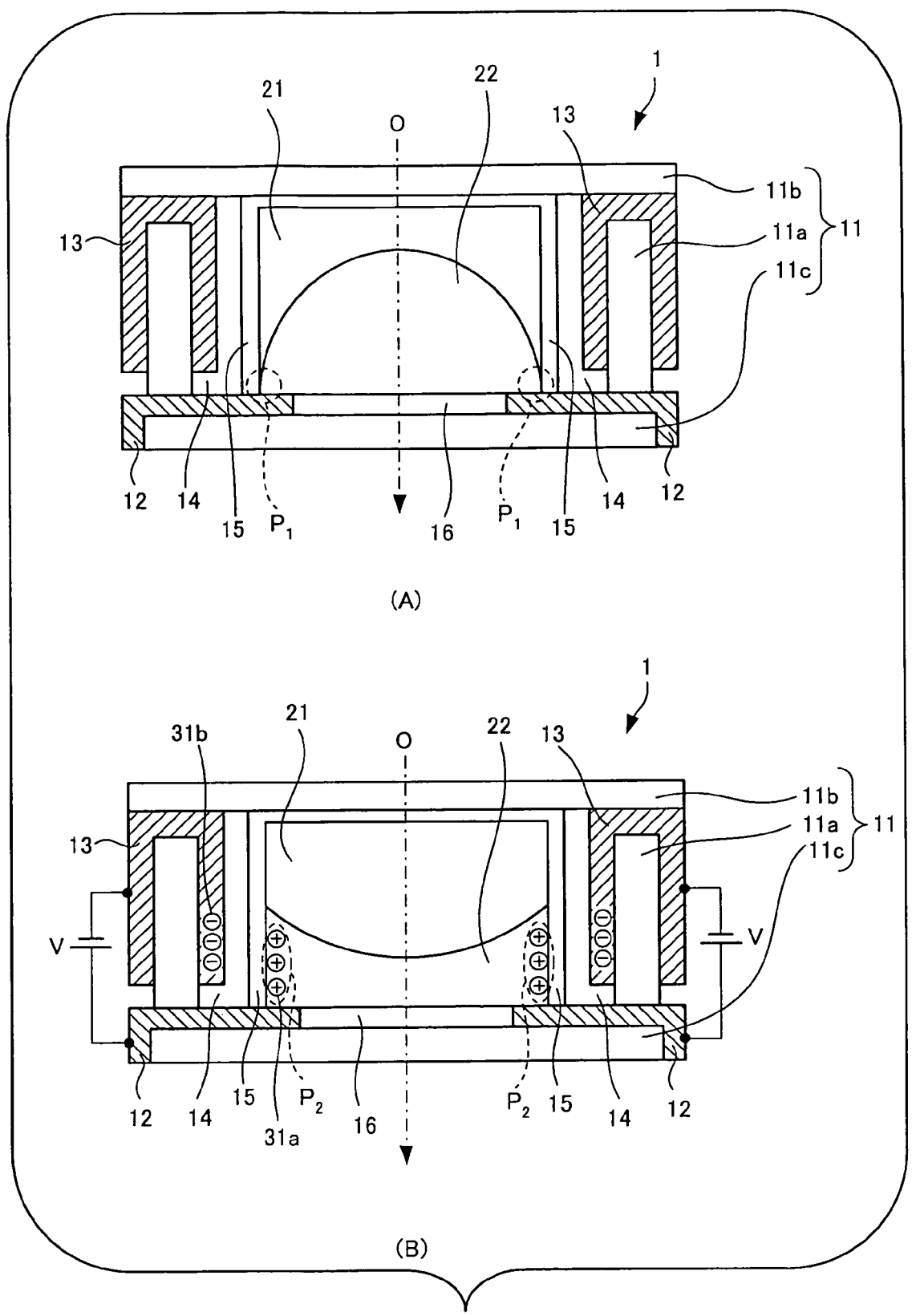
FIG. 1 is a schematic block diagram of a liquid lens which is a comparative example.

FIG. 1 is a schematic block diagram of the liquid lens which is a comparative example. Hereinafter, it is assumed that light passes through the lens in the direction of arrow O, and the light incidence side (top side of FIG. 1) will be designated as the top side while the light exit side (bottom side of FIG. 1) will be designated as the bottom side.

As shown in FIG. 1, the liquid lens 1 is constituted of a glass container 11, which in turn includes a glass tube 11a closed at both ends by glass caps 11b and 11c and containing two immiscible liquids—transparent water 21 which is laced with a supporting electrolyte and transparent oil 22 which is an insulative liquid. Since the oil 22 has a larger refractive index for light than does the water 21, the oil 22 plays the role of a lens which refracts light in the liquid lens 1.

In the container 11, an inner surface of the tube 11a as well as an inner surface of the cap 11b closing the top end of the glass tube 11a are covered with a water-repellent film 15 which repels water while an inner surface of the glass cap 11c closing the bottom end of the tube 11a is covered with a hydrophilic film 16 which has an affinity for water.

An insulating film 14 is provided between the tube 11a and water-repellent film 15. Also, the liquid lens 1 has an anode 12 placed in contact with the water 21 and a cathode 13 insulated from the water 21 by the insulating film 14.

When no voltage is applied between the anode 12 and cathode 13, the water 21 repels water-repellent film 15 and comes into contact with the hydrophilic film 16 as shown in Part (A) of FIG. 1, reducing a contact P1 between the water 21 and water-repellent film 15. Consequently, the water 21 accumulates into a hemispherical shape while the oil 22 pressed by the water 21 accumulates into a cylindrical shape with a bowl-shape formed on the top. In Part (A) of FIG. 1, since the boundary surface between the water 21 and oil 22 is concave-shaped when viewed from the oil 22, the liquid lens 1 functions as a concave lens.

If, for example, a positive voltage is applied to the anode 12 and a negative voltage is applied to the cathode 13, the anode 12 emits positive electric charge 31a into the water 21 while negative electric charge 31b builds up on the cathode 13. At this time, the positive electric charge 31a emitted into the water 21 is attracted to the negative electric charge 31b on the cathode 13 by Coulomb force, increasing a contact P2 between the water 21 and water-repellent film 15 according to the applied voltage. In Part (B) of FIG. 1, since the boundary surface between the water 21 and oil 22 is convex-shaped when viewed from the oil 22, the liquid lens 1 functions as a convex lens. By adjusting the voltages applied to the anode 12 and cathode 13, it is possible to vary the shape of the boundary surface between the water 21 and oil 22 little by little.

In this way, the liquid lens 1 makes it possible to implement a zooming function and focusing function by varying the shape of the boundary surface between the water 21 and oil 22 without using a lens-moving mechanism.

If the liquid lens 1 is mounted on a camera or the like, a user may cause camera shake when pressing a release switch. The liquid lens 1 can only roughly control the shape of the boundary surface between the water 21 and oil 22, making it impossible to accurately adjust the direction of light emitted from the liquid lens 1 and thus difficult to correct camera shake. To correct camera shake using a liquid lens which changes the surface shape of a liquid by application of voltages, it is conceivable, for example, to place multiple electrodes arranged in a matrix instead of the cathode 13, connect a drive line to each of the electrodes to supply a voltage, and separately control the voltages applied from the multiple electrodes. However, the voltages concentrated near the electrodes develop heat in the water 21 and oil 22, causing changes in the refractive index of the liquid lens.

The present invention is based on the detailed analysis described above.

An embodiment of the present invention will be described below with reference to the drawings.

Figure 2:
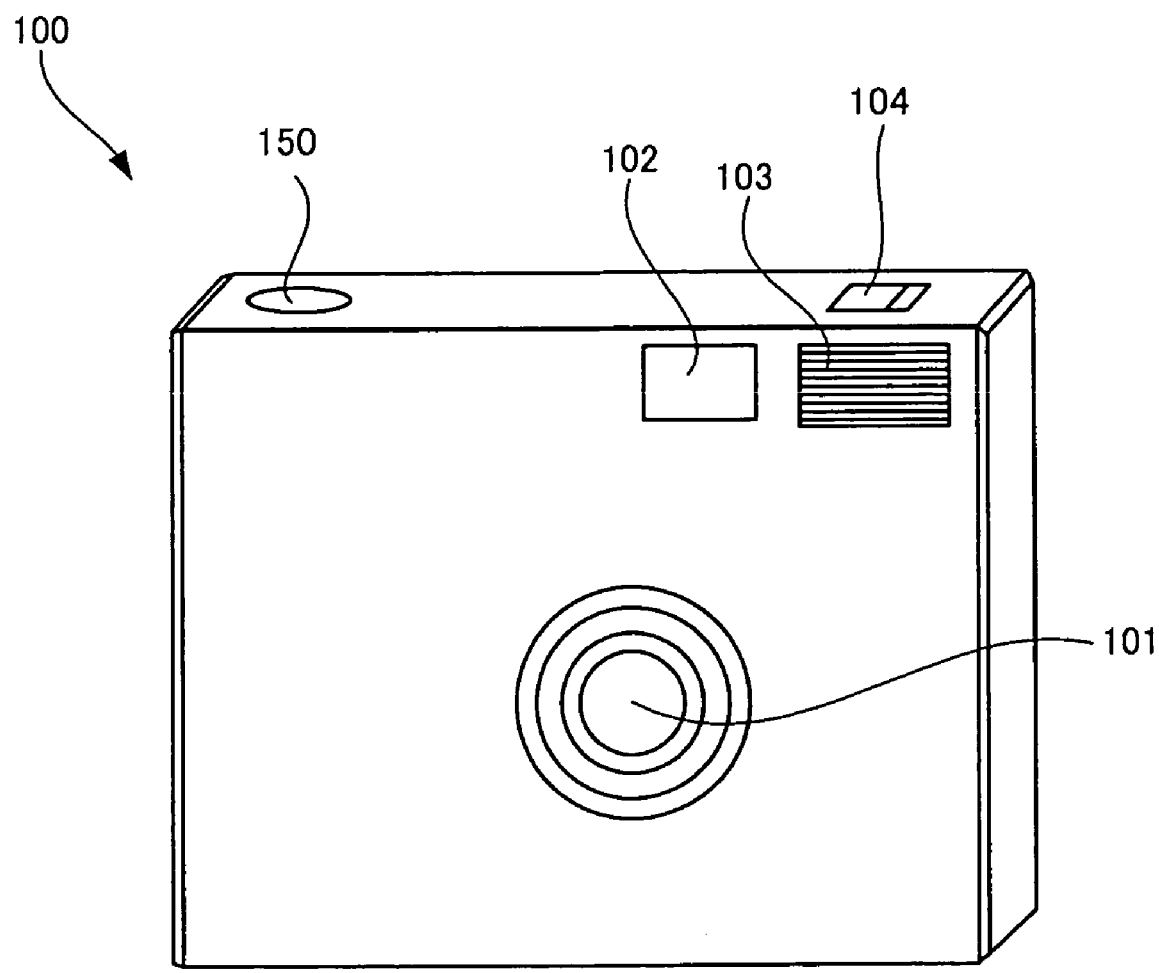
FIG. 2 is an external perspective view of a digital camera according to an embodiment of the present invention, as viewed obliquely from the upper front.

FIG. 2 is an external perspective view of a digital camera according to an embodiment of the present invention, as viewed obliquely from the upper front.

As shown in FIG. 2, at the center in the front face of the digital camera 100, there is a taking lens 101. Also, on an upper front part of the digital camera 100, there are an optical finder's objective window 102 and a fill-flash section 103. Furthermore, on the top face of the digital camera 100, there are a slide-type power switch 104 and a release switch 150.

Figure 3:
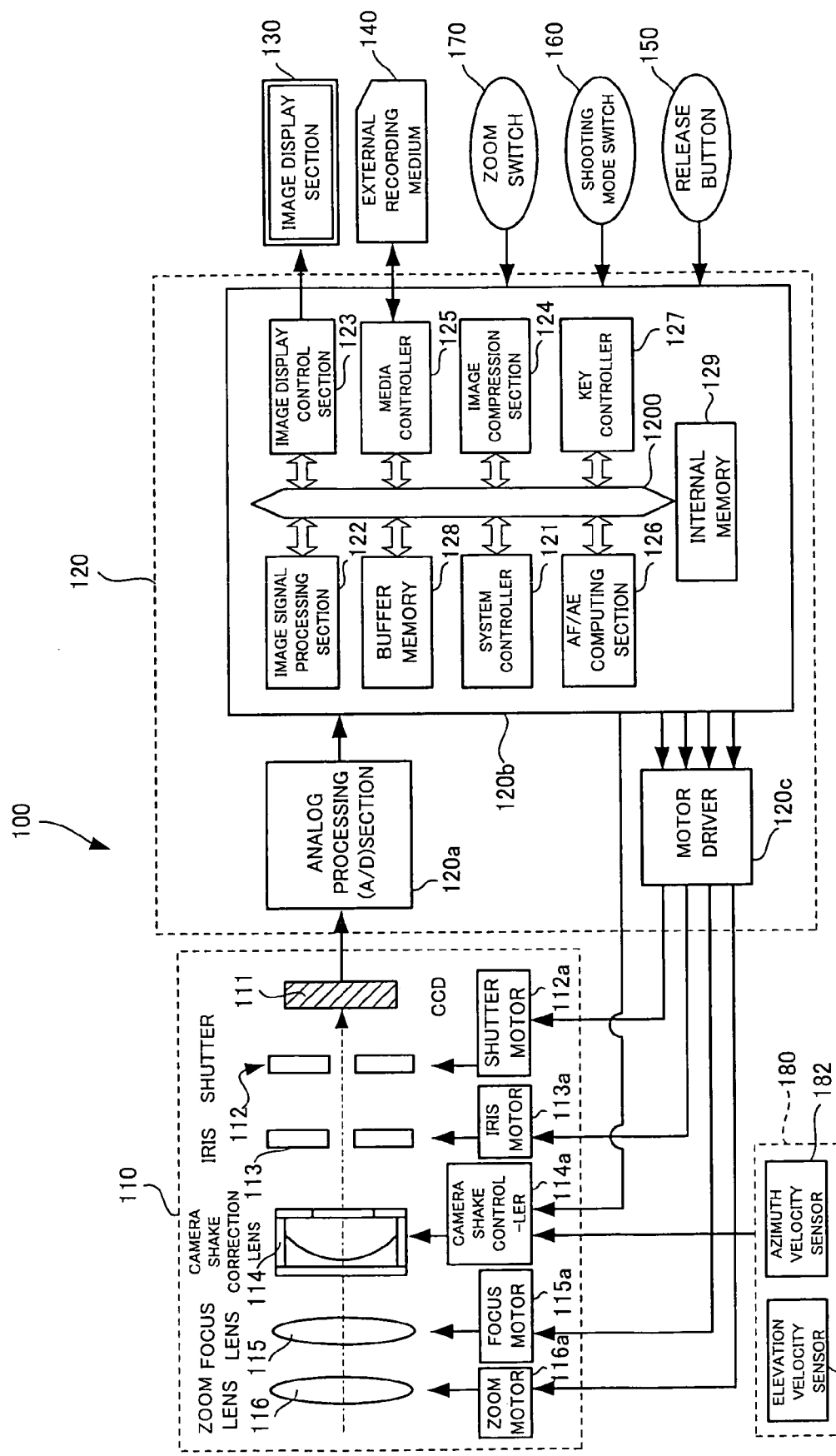
FIG. 3 is a schematic block diagram of the digital camera shown in FIG. 2.

FIG. 3 is a schematic block diagram of the digital camera 100 shown in FIG. 2.

As shown in FIG. 3, the digital camera 100 largely includes a image-taking optical system 110 and a signal processing section 120. Besides, the digital camera 100 is equipped with an image display section 130 for use to display taken images; an external recording medium 140 for use to record image signals obtained by shooting; a zoom switch 170, a shooting mode switch 160, and the release switch 150 for use to make the digital camera 100 perform various processes for shooting; and movement sensors 180 which sense movements of the digital camera 100.

First, a configuration of the image-taking optical system 110 will be described with reference to FIG. 3.

Subject light enters the digital camera 100 from the left side of FIG. 3 through a zoom lens 116, focus lens 115, and a camera shake correction lens 114, and passes through an iris 113 which adjusts quantity of the subject light. When a shutter 112 is open, the subject light forms an image on a CCD 111, which is an example of the image pickup device according to the present invention. Essentially, the image-taking optical system contains multiple lenses, at least one of which plays a major role in focus adjustment while relative positions among the lenses determine focal length. In FIG. 3, the lenses concerned with changing the focal length are schematically shown as the zoom lens 116 while the lenses concerned with the focus adjustment are schematically shown as the focus lens 115.

The zoom lens 116, focus lens 115, iris 113, and shutter 112 are driven by a zoom motor 116a, focus motor 115a, iris motor 113a, and shutter motor 112a, respectively. On the other hand, instead of being equipped with a motor, the camera shake correction lens 114 is equipped with a camera shake controller 114a which changes the shape of the camera shake correction lens 114. Instructions to operate the zoom motor 116a, focus motor 115a, iris motor 113a, and shutter motor 112a are transmitted from a digital signal processing section 120b of a signal processing section 120 via a motor driver 120c while instructions to operate the camera shake controller 114a is transmitted directly from the digital signal processing section 120b. Also, the camera shake controller 114a receives results of sensing from the movement sensors 180. According to this embodiment, the movement sensors 180 are composed of an elevation velocity sensor 181 which measures angular velocity in the elevation direction (up-and-down direction) of the digital camera 100 and azimuth velocity sensor 182 which measures angular velocity in the azimuth direction (right-and-left direction) of the digital camera 100. Measurement results produced by the elevation velocity sensor 181 and azimuth velocity sensor 182 are transmitted to the camera shake controller 114a. Upon receiving operation instructions from the digital signal processing section 120b, the camera shake controller 114a operates according to the results of sensing from the movement sensors 180.

The zoom lens 116 is moved along the optical axis by the zoom motor 116a. As the zoom lens 116 is moved to a position specified by a signal from the signal processing section 120, the focal length is changed and shooting magnification is determined.

The focus lens 115 implements a TTLAF (Through The Lens Auto Focus) function. The TTLAF function moves the focus lens along the optical axis, makes an AF/AE computing section 126 of the signal processing section 120 detect contrast of an image signal obtained by the CCD 111, and moves the focus lens 115 into focus position which corresponds to the lens position that gives a peak contrast. The TTLAF function makes it possible to take a shot by automatically focusing on the subject which gives the peak contrast (i.e., the nearest subject).

The camera shake correction lens 114 implements a camera shake correction function to correct the path of subject light so that the subject light will form an image at the correct position on the CCD 111 even if the digital camera 100 moves. According to this embodiment, the camera shake controller 114a corrects the path of the subject light by changing the shape of the camera shake correction lens 114. A configuration of the camera shake correction lens 114 as well as a method for changing the lens shape will be described in detail later.

The iris 113 adjusts the quantity of subject light, being driven based on instructions from AF/AE computing section 126 of the digital signal processing section 120b.

The above is the configuration of the image-taking optical system 110.

Next, a configuration of the signal processing section 120 will be described. The subject image formed on the CCD 111 in the image-taking optical system is read out as an image signal by an analog processing (A/D) section 120a, which converts the analog signal into a digital signal, which is then supplied to the digital signal processing section 120b. The digital signal processing section 120b is equipped with the system controller 121. Signal processing in the digital signal processing section 120b is performed according to a program which describes operating procedures in the system controller 121. The system controller 121 exchanges data with an image signal processing section 122, image display control section 123, image compression section 124, media controller 125, AF/AE computing section 126, key controller 127, buffer memory 128, and internal memory 129 via a bus 1200. When data is exchanged via the bus 1200, the internal memory 129 serves as a buffer. Data which serve as variables are written as needed into the internal memory 129 according to progress of processes in various parts, and the system controller 121, image signal processing section 122, image display control section 123, image compression section 124, media controller 125, AF/AE computing section 126, and key controller 127 perform appropriate processes with reference to these data. That is, instructions from the system controller 121 are transmitted to the various parts via the bus 1200 to start up the processes in the various parts. The data in the internal memory 129 are updated according to the progress of the processes and referred to by the system controller 121 to control the various parts. In other words, upon power-up, the processes in the various parts are started according to the procedures of the program in the system controller 121. For example, if the release switch 150, zoom switch, or shooting mode switch is manipulated, information about the manipulation is transmitted to the system controller 121 via the key controller 127 and a process corresponding to the manipulation is performed according to the procedures of the program in the system controller 121.

When the shutter is released, the image data read out of the CCD are converted from analog signal into digital signal by the analog processing (A/D) section 120a and the digitized image data are stored temporarily in the buffer memory 128 of the digital signal processing section 120b. An RGB signal of the digitized image data is converted by the image signal processing section 122 into a YC signal, which is then compressed into an image file in JPEG format by the image compression section 124. The resulting image file is recorded on the external recording medium 140 via the media controller 125. The image data recorded in the image file are played back in the image display section 130 via the image display control section 123. During this process, the AF/AE computing section performs computations for focus adjustment and exposure adjustment based on the RGB signal. The AF/AE computing section 126 detects contrast in the RGB signal according to subject distance to adjust focus. Based on the detection results, focus is adjusted by the focus lens 115. The AF/AE computing section extracts a luminance signal from the RGB signal and detects field luminance from the luminance signal. Based on the detected field luminance, the iris 113 adjusts exposure so that an appropriate quantity of subject light will fall on the CCD.

The digital camera 100 is basically configured as described above.

The camera shake correction lens 114 will be described in detail below.

Figure 4:
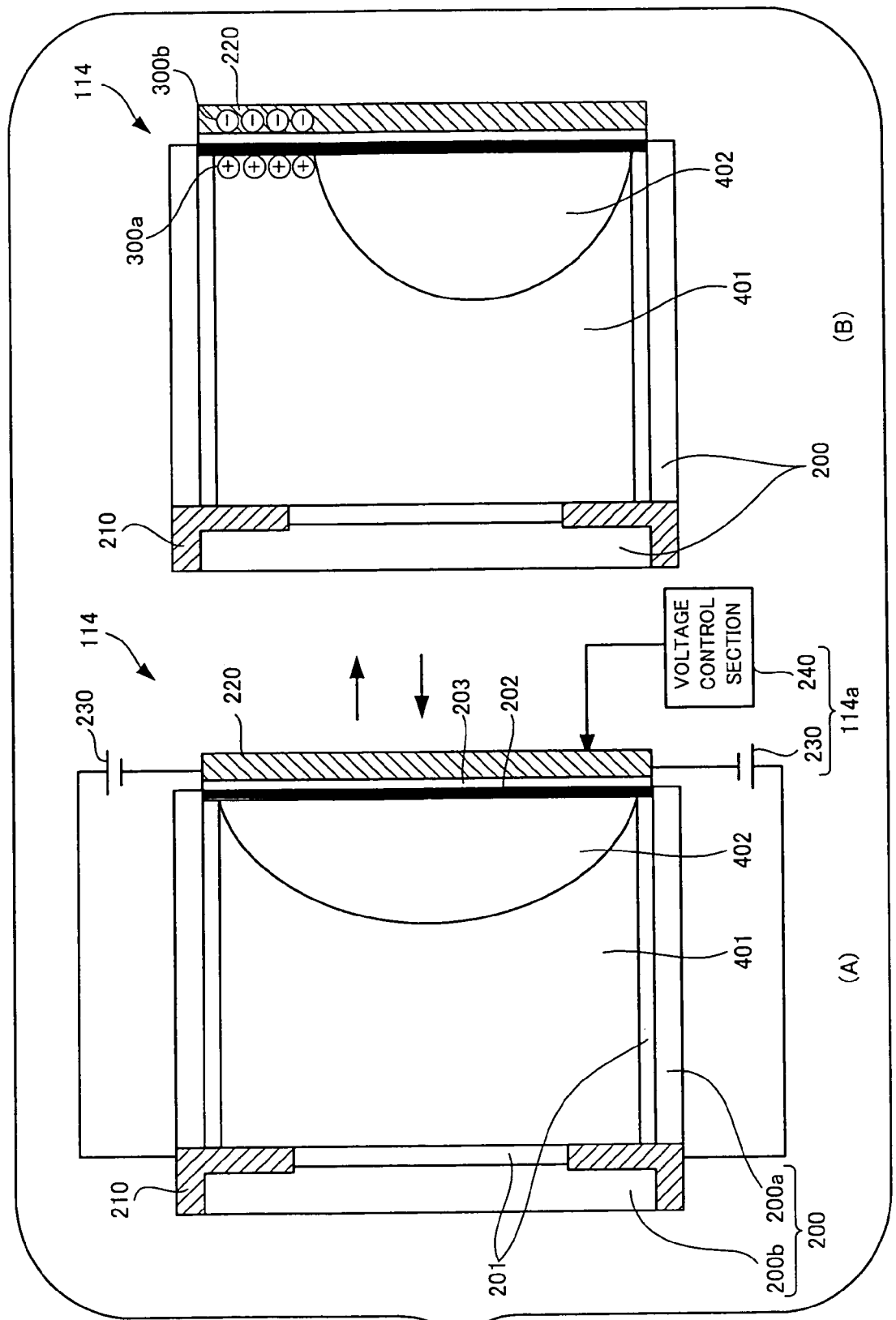
FIG. 4 is a schematic block diagram of a camera shake correction lens 114.

FIG. 4 is a schematic block diagram of the camera shake correction lens 114. It is assumed that subject light enters the digital camera 100 from the left side of FIG. 4. The side from which light enters will be designated as the front (left side of FIG. 4) while the side from which light exists will be designated as the rear (right side of FIG. 4).

The camera shake correction lens 114 is constituted of a fluid container 200, which in turn includes a tube 200a closed at the front end by a transparent substrate 200b and containing a conductive fluid 401 and a insulative fluid 402 immiscible with the conductive fluid 401.

The fluid container 200 is made of an optically transparent material such as ZEONOR (a trade name for plastics manufactured by ZEON CORP. and made of aliphatic dicyclic monomer). It is an example of the fluid container according to the present invention.

On the front side of the tube 200a, the fluid container 200 has an anode 210 placed in contact with the fluid while on the rear side of the tube 200a, it has a cathode 220 insulated from the fluid by a transparent insulating film 203 (e.g., a polyimide film). The anode 210 and cathode 220 are connected to the camera shake controller 114a also shown in FIG. 3. The camera shake controller 114a has a power supply 230 which applies a voltage between the anode 210 and cathode 220, and a voltage control section 240 which controls voltage applied to the cathode 220. The camera shake controller 114a is an example of the control section according to the present invention.

The anode 210 includes a single electrode while the cathode 220 includes multiple electrodes and multiple transparent transistors which adjust voltages applied to the respective electrodes. The anode 210 is an example of the first electrode according to the present invention.

Figure 5:
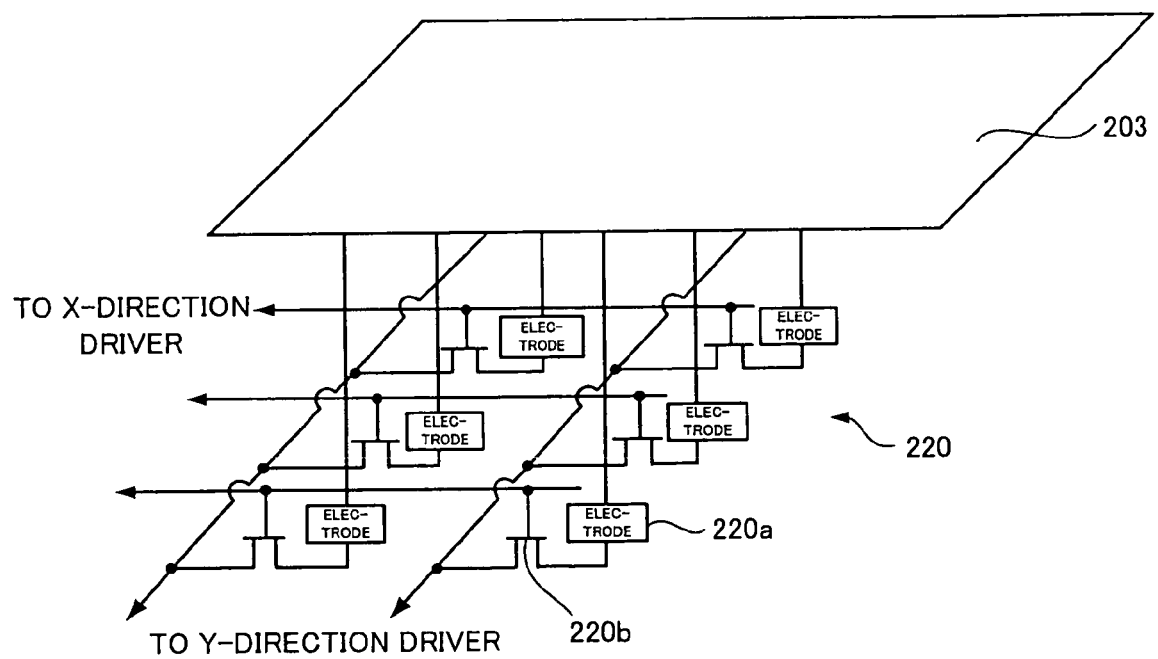
FIG. 5 is a schematic block diagram of a cathode 220.

FIG. 5 is a schematic block diagram of the cathode 220.

The cathode 220 includes multiple transparent drive electrodes 220a which face the fluid in the fluid container 200 across an insulating film 203 (and a water-repellent film 202 described later) and multiple transparent transistors 220b which adjust voltages applied to the respective drive electrodes 220a. The drive electrodes 220a are an example of the second electrodes according to the present invention while the transparent transistors 220b are an example of the transistors according to the present invention.

Figure 6:
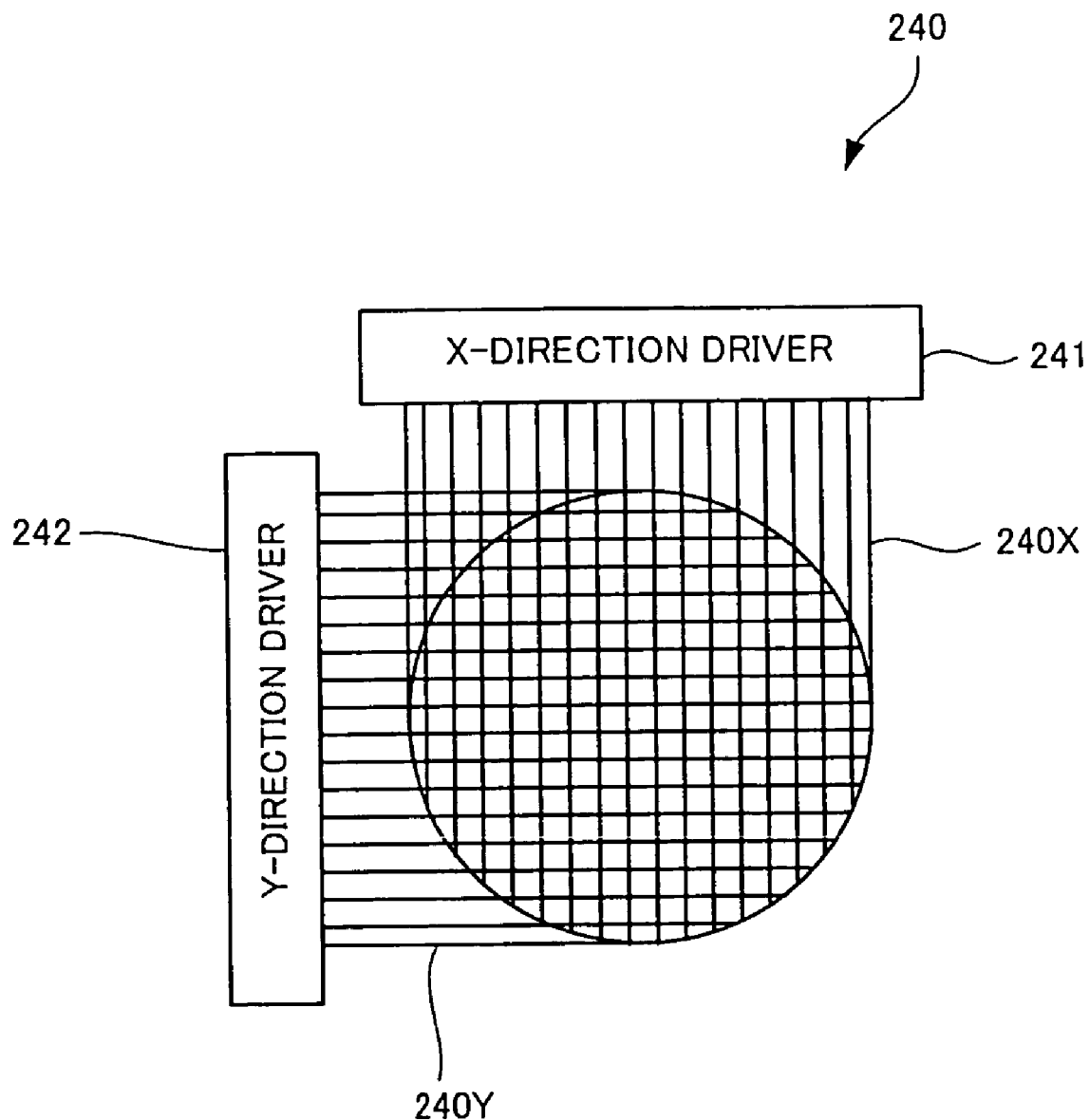
FIG. 6 is a diagram illustrating a layout of drive electrodes 220a and transparent transistors 220b.

FIG. 6 is a diagram illustrating a layout of the drive electrodes 220a and transparent transistors 220b.

The voltage control section 240 shown in FIG. 4 is equipped with an X-direction driver 241 and Y-direction driver 242 which control voltages supplied to the cathode 220. Drive lines 240X and drive lines 240Y for transmitting a drive signal to the transparent transistor 220b extend from the X-direction driver 241 and Y-direction driver 242, respectively. A pair of drive electrode 220a and transparent transistor 220b are installed at each intersection of the drive lines 240X and 240Y. The circle shown in FIG. 6 indicates the outside diameter of the fluid container 200.

Selection of one drive line each in the X and Y directions decides on the transparent transistor located at the intersection. Since multiple transparent transistors are located on each drive line, drive signals are given to the transparent transistors on the same drive line with delay periods. By giving drive signals to the drive lines 240X and 240Y connected to each selected transparent transistor, the X-direction driver 241 and Y-direction driver 242 can separately control the multiple transparent transistors 220b and finely adjust distribution of voltages applied to each of the drive electrodes 220a. Since there is no need to install voltage lines to supply voltages to each of the drive electrodes 220a, it is possible to reduce heat generation in the conductive fluid 401 and insulative fluid 402.

Returning to FIG. 4, we will continue with our description.

In the fluid container 200, an inner surface of the tube 200a as well as that surface (inner surface) of the cap 200b closing the front end of the tube 200a which is in contact with the fluid are covered with a hydrophilic film 201 which has an affinity for water while the cathode 220 installed at the rear end of the tube 200a is covered with a water-repellent film 202 via the insulating film 203. The water-repellent film 202 is an example of the coating film according to the present invention.

The fluid container 200 contains the conductive fluid 401 and insulative fluid 402 which have optical transparency and differ in refractive index from each other. This embodiment uses a hydrophilic liquid—namely, water laced with a supporting electrolyte (0.1 mol/L of tetrabutyl ammonium perchlorate)—as the conductive fluid 401 and uses a hydrophobic organic solvent (ISOPAR manufactured by Exxon Corp.) as the insulative fluid 402. The conductive fluid 401 is an example of the conductive fluid according to the present invention while the insulative fluid 402 is an example of the insulative fluid according to the present invention.

When no voltage is applied between the anode 210 and cathode 220, the hydrophilic conductive fluid 401 and water-repellent film 202 repel each other and the hydrophobic insulative fluid 402 and hydrophilic film 201 repel each other, stabilizing the boundary surface between the conductive fluid 401 and insulative fluid 402 in a state shown in Part (A) of FIG. 4. If it is assumed that $n1<n2$, where $n1$ is the refractive index of the conductive fluid 401 and $n2$ is the refractive index of the insulative fluid 402, in the stable state shown in Part (A) of FIG. 4, the boundary surface is convex-shaped when viewed from the insulative fluid 402, and thus the camera shake correction lens 114 functions as a convex lens.

For example, if the X-direction driver 241 and Y-direction driver 242 (shown in FIG. 6) give drive signals to the multiple transparent transistors 220b (shown in FIG. 5), specifying large voltages to be applied only to the top side of the camera shake correction lens 114, the large voltages are applied only to the upper drive electrodes 220a. At this time, in the camera shake correction lens 114 shown in FIG. 4, positive electric charge 300a emitted into the conductive fluid 401 from the anode 210 and negative electric charge 300b built up on the upper drive electrodes 220a attract each other by Coulomb force, causing the boundary surface between the conductive fluid 401 and insulative fluid 402 to become convex downward as shown in Part (B) of FIG. 4. Consequently, the center position of the lens (location of the convex part on the boundary between the conductive fluid 401 and insulative fluid 402) moves downward, changing the path of the light passing through the camera shake correction lens 114 downward.

The camera shake correction lens 114 is configured as follows.

The digital camera 100 can be moved when, for example, the user presses the release switch 150 (shown in FIG. 2). In that case, the movement of the digital camera 100 changes the path of the subject light passing through the zoom lens 116 and focus lens 115 shown in FIG. 3. Without camera shake correction, image location on the CCD 111 may be displaced, resulting in blurring of a taken image.

The digital camera 100 according to this embodiment corrects the path of subject light due to movements of the digital camera 100 by varying the position of the boundary between the conductive fluid 401 and insulative fluid 402 of the camera shake correction lens 114.

As the user presses the release switch 150 shown in FIG. 2, the camera shake controller 114a acquires angular velocities (elevation velocity and azimuth velocity) of the digital camera 100 from the movement sensors 180.

The voltage control section 240 of the camera shake controller 114a makes the X-direction driver 241 and Y-direction driver 242 vary voltages at velocities corresponding to the angular velocities acquired from the movement sensors 180. Consequently, the position of the boundary between the conductive fluid 401 and insulative fluid 402 moves in the up-and-down direction and right-and-left direction, respectively, at velocities corresponding, respectively, to the elevation velocity and azimuth velocity acquired from the movement sensors 180. The X-direction driver 241 and Y-direction driver 242 gives drive signals separately to the transparent transistors 220b using the drive lines 240X and 240Y.

The transparent transistors 220b adjust the voltages applied to respective drive electrodes 220a. When voltages are applied between the drive electrodes 220a and anode 210, the position of the boundary between the conductive fluid 401 and insulative fluid 402 moves according to the voltages, adjusting the path of the subject light passing through the camera shake correction lens 114.

Figure 7:
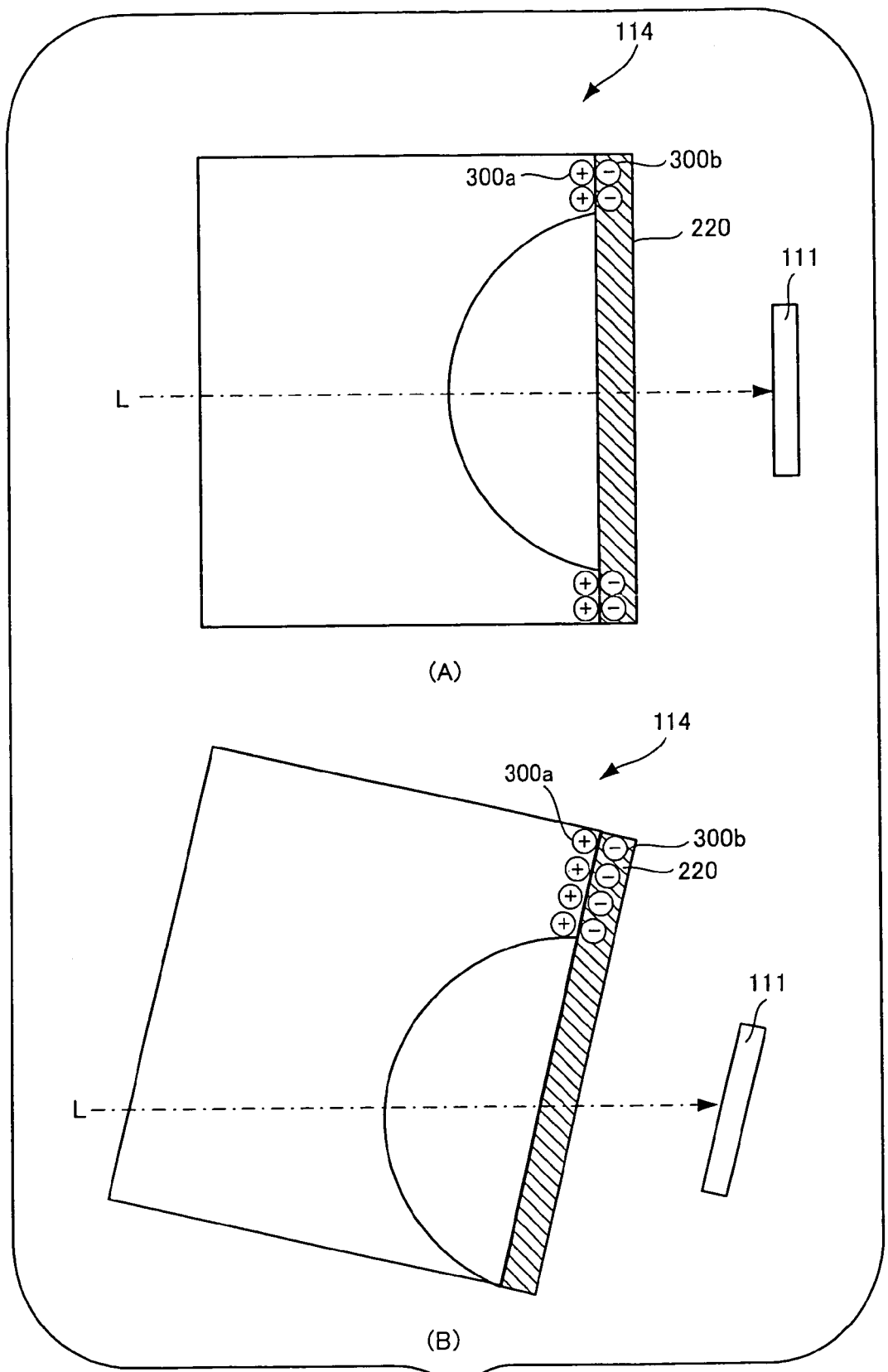
FIG. 7 is a diagram illustrating a change in an optical path made by the camera shake correction lens 114.

FIG. 7 is a diagram illustrating a change in an optical path made by the camera shake correction lens 114.

When the digital camera 100 is looking straight ahead, voltages are applied by the multiple transparent transistors 220b shown in FIG. 5 to the drive electrodes 220a on the periphery excluding those in the center. Consequently, as shown in Part (A) of FIG. 7, the positive electric charge 300a emitted from the anode 210 and negative electric charge 300b built up on the upper drive electrodes 220a on the periphery attract each other by Coulomb force, causing the boundary between the conductive fluid 401 and the insulative fluid 402 to take a convex shape, and the convex shape is adjusted so that its center will be placed on the optical axis. At this time, the camera shake correction lens 114 works as a convex lens whose lens center is aligned with the optical axis of the digital camera 100 and subject light L is focused on the correct position on the CCD 111.

For example, if the front face of the digital camera 100 looks upward (camera shake in the elevation direction) when the user presses the release button 150, voltages are applied only to the upper drive electrodes 220a out of the multiple drive electrodes 220a by the multiple transparent transistors 220b shown in FIG. 5, the position of the boundary between the conductive fluid 401 and insulative fluid 402 moves downward, maintaining the convex shape as shown in Part (B) of FIG. 7. Consequently, the light L entering the camera shake correction lens 114 forms an image at the correct position on the CCD 111.

In this way, the digital camera 100 according to this embodiment can avoid camera shake reliably and obtain taken images of high quality.

Incidentally, although in the above embodiment, the multiple drive electrodes 220a of the cathode 220 are arranged in a matrix, this is not restrictive.

Figure 8:
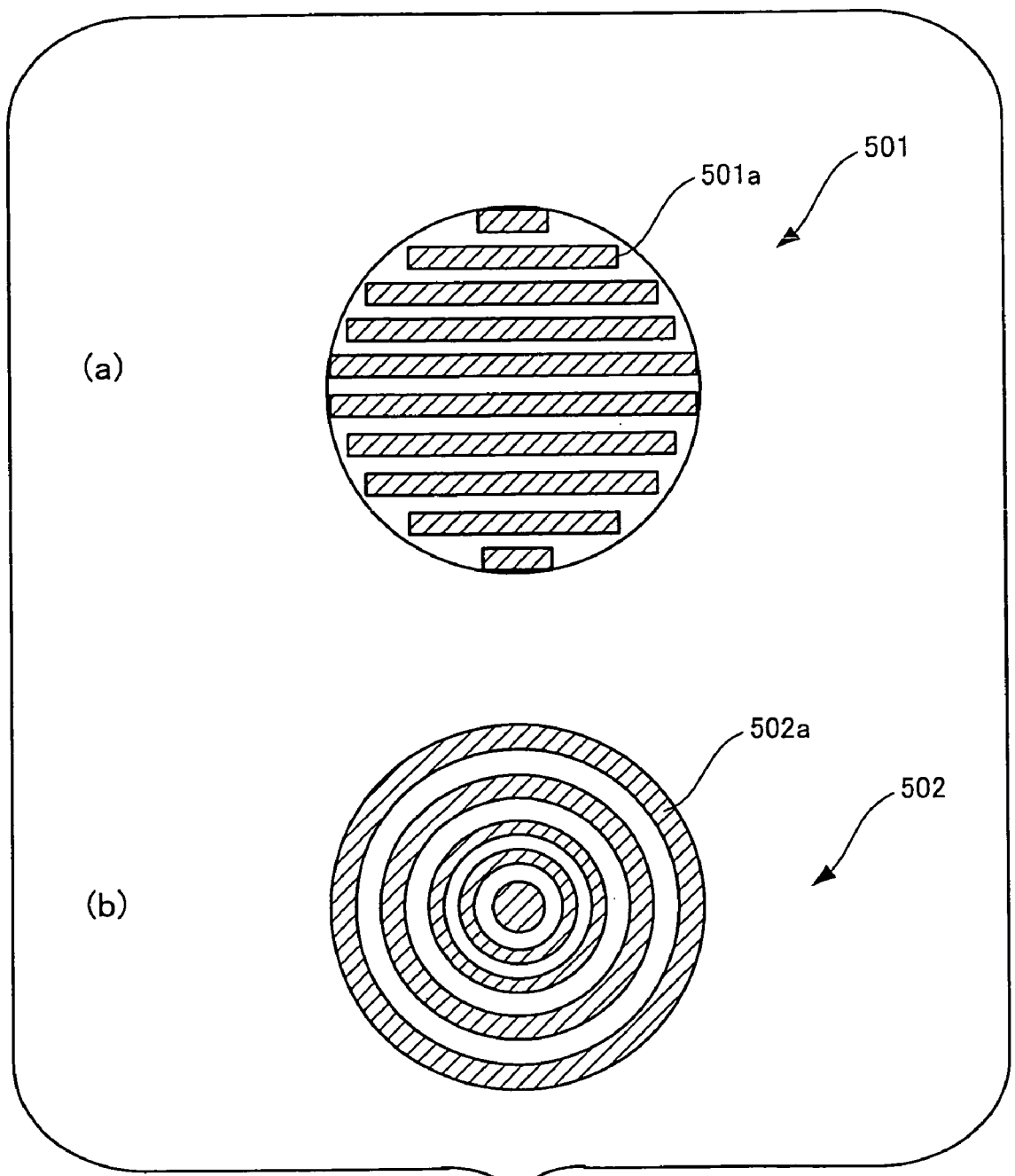
FIG. 8 is a diagram showing a layout example of multiple electrodes.

FIG. 8 is a diagram showing a layout example of multiple electrodes.

An anode 501 shown in Part (a) of FIG. 8 have electrodes 501a which are arranged in a horizontal stripe pattern. An anode 502 shown in Part (b) of FIG. 8 have concentrically arranged electrodes. The path of the subject light passing through the camera shake correction lens 114 may be controlled freely by controlling the position of the boundary between the conductive fluid 401 and insulative fluid 402 using such an anode 501 or 502.

Although in the above embodiment, the optical element and optical unit according to the present invention are used to prevent camera shake, they may be used for a focus lens and zoom lens. For example, when the optical element and optical unit according to the present invention are used for a focus lens and zoom lens, by applying a voltage for implementation of a TTLAF function and voltage for implementation of a camera shake correction function between a first electrode and each of multiple second electrodes, it is possible to implement these functions in a single lens.

Also, although the above embodiment uses only one first electrode according to the present invention, it is alternatively possible to use multiple first electrodes according to the present invention and install multiple transparent transistors to control respective voltages applied to the multiple first electrodes.

Also, although in the above embodiment, the multiple second electrodes according to the present invention are arranged in a matrix, the multiple second electrodes according to the present invention may be arranged, for example, concentrically.

Also, although in the above example, the fluid container contains two types of fluid, namely, the conductive fluid and insulative fluid, the fluid container according to the present invention may contain more than two types of fluid.

Also, although a conductive liquid and insulative conductive liquid have been cited as examples of the conductive fluid and insulative fluid according to the present invention, the conductive fluid and insulative fluid according to the present invention may be sols.

Next, possible forms of various components composing the present invention will be described additionally.

<Fluids>

The conductive fluid and insulative fluid according to the present invention may be two or more types of fluids as long as they are immiscible fluids which differ in refractive index from each other. Preferably, the difference between their specific gravities is not more than 0.1.

Any combination of fluids may be used, but preferably a combination of water and organic solvent is used. Preferable organic solvents include hydrocarbons (hexane, heptane, pentane, octane, ISOPAR (Exxon Corp.), etc.), aromatic hydrocarbons (benzene, toluene, xylen, mesitylene, etc.), halogenated hydrocarbons (dichloropropane, dichloroethane, chloroethane, bromoethane, etc.), halogenated aromatic hydrocarbons (chlorobenzene, etc.), and ether compounds (dibutyl ether, anisole, diphenyl ether, etc.). More preferable organic solvents include Tetralin, and Daphnon.

Preferably, a supporting electrolyte is added to the water to enhance its electrical conductivity. Available supporting electrolytes include TMAP (Tetramethylammonium perchlorate), TBAF (Tetrabutylammonium hexafluorophosphate), etc.

<Transparent Transistor>

Available substrates for the transparent transistor include glass substrates and film substrates.

A possible method for forming the transparent transistor involves growing a monocrystalline ZnO thin film epitaxially on a substrate by MBE method, pulsed laser deposition method (PLD method), or the like and growing a thin film of a homologous compound expressed by $InMO_3(ZnO)_m$ (where M=In, Fe, Ga, or Al; m is an integer less than 50, but not less than 1) on the ZnO thin film by MBE method, pulsed laser deposition method (PLD method), or the like using sintered polycrystalline bodies of the oxide as targets.

The resulting thin film does not have to be a monocrystalline film, and it may be a polycrystalline film or amorphous film. Finally, it is preferable that the entire thin film is covered with a high-melting point compound such as $Al_2O_3$ and subjected to thermal diffusion at high temperature and atmosphere pressure in the presence of ZnO vapor.

$InMO_3(ZnO)_m$ (where M=In, Fe, Ga, or Al; m is an integer less than 50, but not less than 1) and the ZnO film diffuse into each other and react with each other to form $InMO_3(ZnO)_{m'}$ if an appropriate temperature is set, (where M=In, Fe, Ga, or Al; m' is an integer less than 50, but not less than 1) of uniform composition, where m' is determined by the film thickness ratio between $InMO_3(ZnO)_m$ (where M=In, Fe, Ga, or Al; m is an integer less than 50, but not less than 1) and the ZnO film. When the thickness of the ZnO film is less than 5 nm and the film thickness of $InMO_3(ZnO)_m$ (where M=In, Fe, Ga, or Al; m is an integer less than 50, but not less than 1) is more than 100 nm, m=m'.

The right temperature is between 800 and 1600 degrees (both inclusive), and more preferably between 1200 and 1500 degrees (both inclusive). At temperatures below 800 degrees, diffusion proceeds slowly, making it impossible to obtain $InMO_3(ZnO)_m$ (where M=In, Fe, Ga, or Al; m is an integer less than 50, but not less than 1) of uniform structure. On the other hand, at temperatures above 1600 degrees, evaporation of ZnO cannot be suppressed, making it impossible to obtain $InMO_3(ZnO)_m$ (where M=In, Fe, Ga, or Al; m is an integer less than 50, but not less than 1) of uniform structure.

The homologous monocrystalline film containing ZnO and obtained by reactive solid-phase epitaxy has a nearly stoichiometric composition and has insulation performance of 108 W·cm or higher at room temperature. It is suitable for normally-off field-effect transistors.

Homologous monocrystalline thin film composed primarily of the resulting ZnO can be used as an active layer to produce top-gate MIS field-effect transistors.

A gate insulation film as well as a metal film for use as a gate electrode are formed on the homologous monocrystalline thin film composed primarily of the ZnO and grown epitaxially on the substrate.

The most suitable material for the gate insulation film is $Al_2O_3$. The metal film for use as a gate electrode may be made of Au, Ag, Al, or Cu. A gate electrode 4 is produced by optical lithography, dry etching, or lift-off process and finally, a source electrode 5 and drain electrode 6 are produced.

Possible types of the field-effect transistor according to the present invention include the top-gate MIS field-effect transistor (MIS-FET), J-FET, etc.

Homologous amorphous thin film composed primarily of ZnO can also be used to produce the top-gate MIS field-effect transistor. The amorphous thin film does not need epitaxial growth, and thus epitaxial growth and high temperature annealing processes of ZnO can be eliminated. This makes it possible to mount the gate electrode between the substrate and film, and thus produce a bottom-gate MIS field-effect transistor.

Now description will be given of an example of the transparent transistor according to the present invention produced by combining the preferred examples described above.

EXAMPLE 1

Producing a Monocrystalline Thin Film of $InGaO_3(ZnO)_5$

A 2 nm-thick ZnO thin film is grown epitaxially on a monocrystalline silicon substrate by PLD method at a substrate temperature of 700 degrees. Next, the substrate is cooled to room temperature, and a 50 nm-thick polycrystalline thin film of $InGaO_3(ZnO)_5$ is deposited on the epitaxial thin film of ZnO by PLD method. The two-layer film thus produced is removed into the atmosphere, subjected to thermal diffusion in the atmosphere at 1400 degrees for 30 minutes using an electric furnace, and then cooled to room temperature.

EXAMPLE 2

Producing a MISFET

A top-gate MISFET element is produced by photolithography. Au is used for the source and drain electrodes and amorphous $Al_2O_3$ is used for the gate insulation film. The channel length and channel width are 0.05 mm and 0.2 mm, respectively.

A basic configuration which implements the concept of the present invention has been described above, and when putting the optical element according to the present invention to practical use, it is preferable to devise some measures to keep the optical path free of dust, water droplets, etc. and thereby prevent degradation of lens performance.

For example, preferably a water-repellent film is placed over that external surface of the fluid container which intersects with the optical path (hereinafter this surface will be referred to as a light-transmitting surface). By giving water repellency to the light-transmitting surface, it is possible to keep off dust, water droplets, etc. and maintain high optical transparency of the optical element. Preferable materials for the water-repellent film include silicon resins, block copolymers of organopolysiloxane, fluorinated polymers, and polytetrafluoroethane.

Also, preferably a hydrophilic film is placed over the light-transmitting surface of the container of the optical element. It is also possible to keep off dust by giving hydrophilicity and lipophobicity to the light-transmitting surface. Preferably, hydrophilic film is made of acrylate polymers or coated with a surface-active agent such as a non-ionic organosilicone surface-active agent. It can be produced by plasma polymerization or ion beam processing of silane monomers.

Also, preferably, a photocatalyst such as a titanium dioxide is applied to the light-transmitting surface of the container of the optical element. The photocatalyst reacts with light to break down dirt and the like, making it possible to keep the light-transmitting surface clean.

Also, preferably, anti-static film is placed over the light-transmitting surface of the container of the optical element. If electrostatic charges build up on the light-transmitting surface of the container or if the light-transmitting surface is charged by electrodes, the light-transmitting surface may gather dust and the like. By placing the anti-static film over the light-transmitting surface, it is possible to keep off such undesired substances and thereby maintain the optical transparency of the optical element. Preferably, the anti-static film is made of a polymer alloy-based material, which more preferably is a polymer alloy of a polyether type or polyether ester amide type, a polymer alloy containing a cationic group, or a polymer alloy with a trade name of REOLEX (Dai-ichi Kogyo Seiyaku Co., Ltd.). Also, preferably, the anti-static film is produced by a misting process.

Also, an antifouling material may be used for the container of the optical element. Preferably the antifouling material is fluoroplastics. Specifically, fluoroalkylalkoxysilane compounds, polymers containing fluoroalkyl groups, oligomers, etc. are preferable and substances which have functional groups capable of being cross-linked with the hardening resins are especially preferable. Preferably, the antifouling material is added in the minimum amount required to produce an antifouling effect.

What is claimed is:

1. An optical element comprising:
   a fluid container which contains an insulative fluid and a conductive fluid that are different in refractive index from each other, mutually immiscible, and optically transparent, the fluid container being transparent to light at least in a predetermined direction;
   a first electrode placed in contact with the conductive fluid in the fluid container;
   a plurality of transparent second electrodes placed on a transparent surface of the fluid container and insulated from the conductive fluid the fluid container, with a voltage being applied between the first electrode and each of the plurality of transparent second electrodes; and
   a plurality of transparent transistors placed on the transparent surface of the fluid container together with the plurality of second electrodes to adjust the voltages applied to the plurality of second electrodes.

2. The optical element according to claim 1, wherein an inner surface of the fluid container is covered at least partially with a coating whose wettability by the conductive fluid is lower than by the insulative fluid.

3. The optical element according to claim 1, wherein the plurality of second electrodes are arranged in a matrix.

4. An optical unit comprising:
   a fluid container which contains an insulative fluid and a conductive fluid that are different in refractive index from each other, mutually immiscible, and optically transparent, the fluid container being transparent to light at least in a predetermined direction;
   a first electrode placed in contact with the conductive fluid in the fluid container;
   a plurality of transparent second electrodes placed on a transparent surface of the fluid container and insulated from the conductive fluid in the fluid container, with a voltage being applied between the first electrode and each of the plurality of transparent second electrodes;

a plurality of transparent transistors placed on the transparent surface of the fluid container together with the plurality of second electrodes to adjust the voltages applied to the plurality of second electrodes; and a control section which controls refraction of light passing through the fluid container by applying individually drive signals to the plurality of transistors separately, thereby applying a voltage between the first electrode and each of the plurality of second electrodes, and thereby changing shape of a boundary surface between the insulative fluid and the conductive fluid.

5. An image-taking apparatus, comprising:

a fluid container which is transparent to light at least in a predetermined direction and contains a fluid;

an optically transparent dispersion medium contained in the fluid container;

an optically transparent dispersoid which, being dispersed in the dispersion medium and different in refractive index from the dispersion medium, achieves an electrophoretic movement in the dispersion medium by application of an electric field a first electrode;

a plurality of transparent second electrodes placed on a transparent surface of the fluid container, with a voltage being applied between the first electrode and each of the plurality of transparent second electrodes;

a plurality of transparent transistors placed on the transparent surface of the fluid container together with the plurality of second electrodes to adjust the voltages applied to the plurality of second electrodes;

a control section which controls refraction of light passing through the fluid container by applying individually drive signals to the plurality of transistors separately, thereby applying a voltage between the first electrode and each of the plurality of second electrodes, and thereby changing shape of a boundary surface between the insulative fluid and the conductive fluid; and an image pickup device which generates an image signal of subject light that forms an image on a surface of the image pickup device after passing through the fluid container.

* * * * *